JOHN F. BELL
ALBERT COTSWORTH III
INVENTOR.
BY Bruce L Birchard
HIS AGENT

May 13, 1952 J. F. BELL ET AL 2,596,117

FREQUENCY CONVERTER SYSTEM

Filed Nov. 6, 1948 4 Sheets-Sheet 2

JOHN F. BELL.
ALBERT COTSWORTH III
*INVENTOR.*

BY [signature]
HIS AGENT

JOHN F. BELL
ALBERT COTSWORTH III
*INVENTOR.*
BY [signature]
HIS AGENT

May 13, 1952 J. F. BELL ET AL 2,596,117

FREQUENCY CONVERTER SYSTEM

Filed Nov. 6, 1948 4 Sheets-Sheet 4

JOHN F. BELL
ALBERT COTSWORTH III
*INVENTOR.*

BY Bruce T. Burchard
HIS AGENT

Patented May 13, 1952

2,596,117

UNITED STATES PATENT OFFICE 2,596,117

FREQUENCY CONVERTER SYSTEM

John F. Bell, Glenview, and Albert Cotsworth, III, Oak Park, Ill., assignors to Zenith Radio Corporation, a corporation of Illinois Application November 6, 1948, Serial No. 58,696

16 Claims. (Cl. 250—20)

Figure 1:
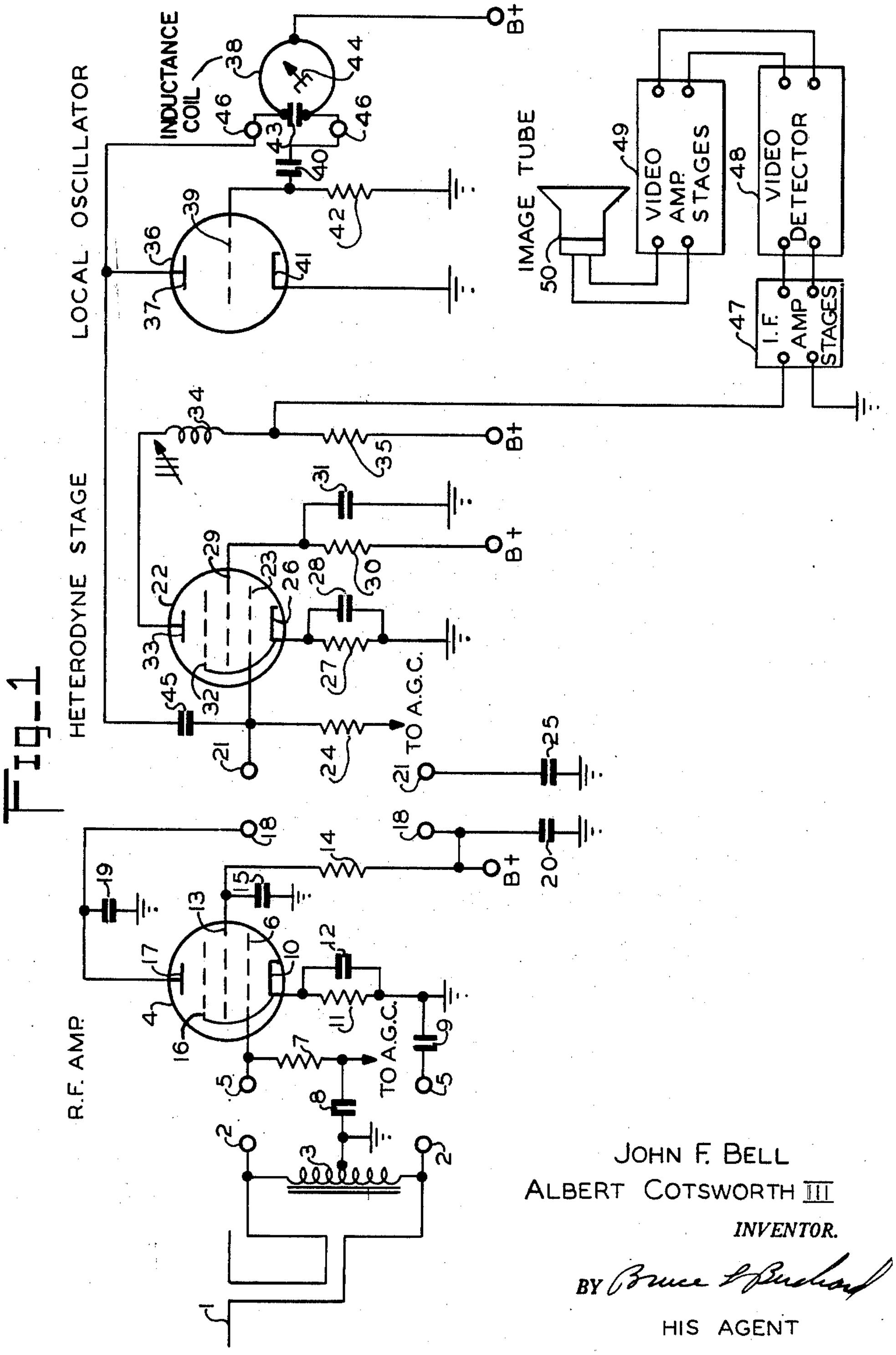

This invention relates to television receivers, radio receivers and the like, and more particularly to an adapter unit for inclusion in such receivers to change the tuning range thereof from one frequency band to another.

Present day radio receivers and television receivers are usually tuned to pre-selected channels by means of turret tuners, or similar devices, operated manually or by automatic means. Such receivers usually include several tunable stages of radio-frequency amplification, a tunable local oscillator and heterodyne stage, and several stages of intermediate-frequency amplification fixedly tuned to a pre-selected intermediate frequency. When the turret tuner is adjusted to select a particular wave signal channel, circuit elements of predetermined value are switched into the radio-frequency amplifier stages, heterodyne stage and local oscillator stage to provide a signal input to the intermediate-frequency amplifier at the preassigned intermediate frequency of the receiver, which signal is modulated with intelligence according to the intelligence contained on the signal in the selected channel. The frequency range through which the receiver may be tuned, and still maintain the proper intermediate frequency, is limited by the frequency range of the local oscillator and by the frequency response characteristic of the radio-frequency amplifier. However, it is impractical to provide a local oscillator in such receivers which is highly stable and which may also be caused to generate oscillations through a wide frequency range. It is also difficult to provide a stable local oscillator that generates oscillations of sufficiently high frequency to heterodyne with high frequency received signals and produce the desired intermediate frequency with a single heterodyne action. Furthermore, it is expensive and impractical to provide a radio-frequency amplifier capable of being tuned over the frequency range that is now contemplated for television transmission. To overcome these difficulties, receivers have been proposed that use two local oscillators and a double heterodyne action to obtain the desired intermediate frequency from a received high frequency signal.

It is, therefore, an object of this invention to provide an improved and inexpensive system for controlling a wave signal receiver to enable efficient reception of wave signals distributed over an unusually wide frequency range.

It is a further object of the present invention to provide an improved adapter unit for connection into television receivers, radio receivers and the like, operating in a certain frequency band, for converting such receivers by means of the double heterodyne principle for operation in a higher frequency band.

In designing a circuit for converting a receiver utilizing a single heterodyning stage to one employing two heterodyning stages in cascade, cost and space are factors to be considered, and when two heterodyning oscillators are employed, these factors become quite substantial. In addition, when two heterodyning oscillators are used in a sensitive receiver, an extremely large number of spurious responses are likely to result, especially when the two oscillators are positioned close together. It is, therefore, a further object of this invention to provide such an improved converter circuit that is inexpensive, may be mounted in a restricted space and which may be utilized in sensitive receivers.

The present invention is especially applicable to television receivers. The frequency band allocated at present to the transmission of television signals extends approximately from 50 to 220 megacycles, and present day television receivers are designed to be tuned to signals within this band. Should the frequency band so allocated be changed to occupy another position in the frequency spectrum, for example, the 500 to 1,000 megacycle band, it is apparent that the necessity would arise to re-design all existing conventional television receivers to enable them to be tuned to the higher frequency band. It is, therefore, a further object of this invention to provide an improved adapter unit arranged to be quickly and conveniently connected into a television receiver, whereby that receiver may be converted to receive signals in a higher frequency band than the band to which the receiver is capable of being tuned without such conversion.

The present invention will be described in conjunction with a television receiver capable of being tuned to selected channels in a certain frequency band by means of a manually operated turret tuner. However, it is to be understood that the frequency converter circuit may be used in many types of superheterodyne radio receivers or television receivers in which it is desired to convert the tuning range thereof from one band to another. The turret tuner consists of a plurality of tuning strips mounted on a rotatable member. Each strip carries circuit elements that are preset to tune the receiver to respective signal channels to which the receiver is to respond. When the rotatable member is turned, the elements carried by the strips are caused to be selectively connected into the radio-frequency amplifier stages, heterodyne stage and local oscillator stage of the receiver, to tune the receiver to selected signals in a certain frequency band.

Yet another object of this invention is to provide a tuning strip which may be mounted on the turret tuner of a signal receiver, which tuning strip, when connected into the circuit of the receiver, acts to tune the receiver to a signal in a frequency band that is otherwise outside of the tuning range of the receiver.

Figure 2:
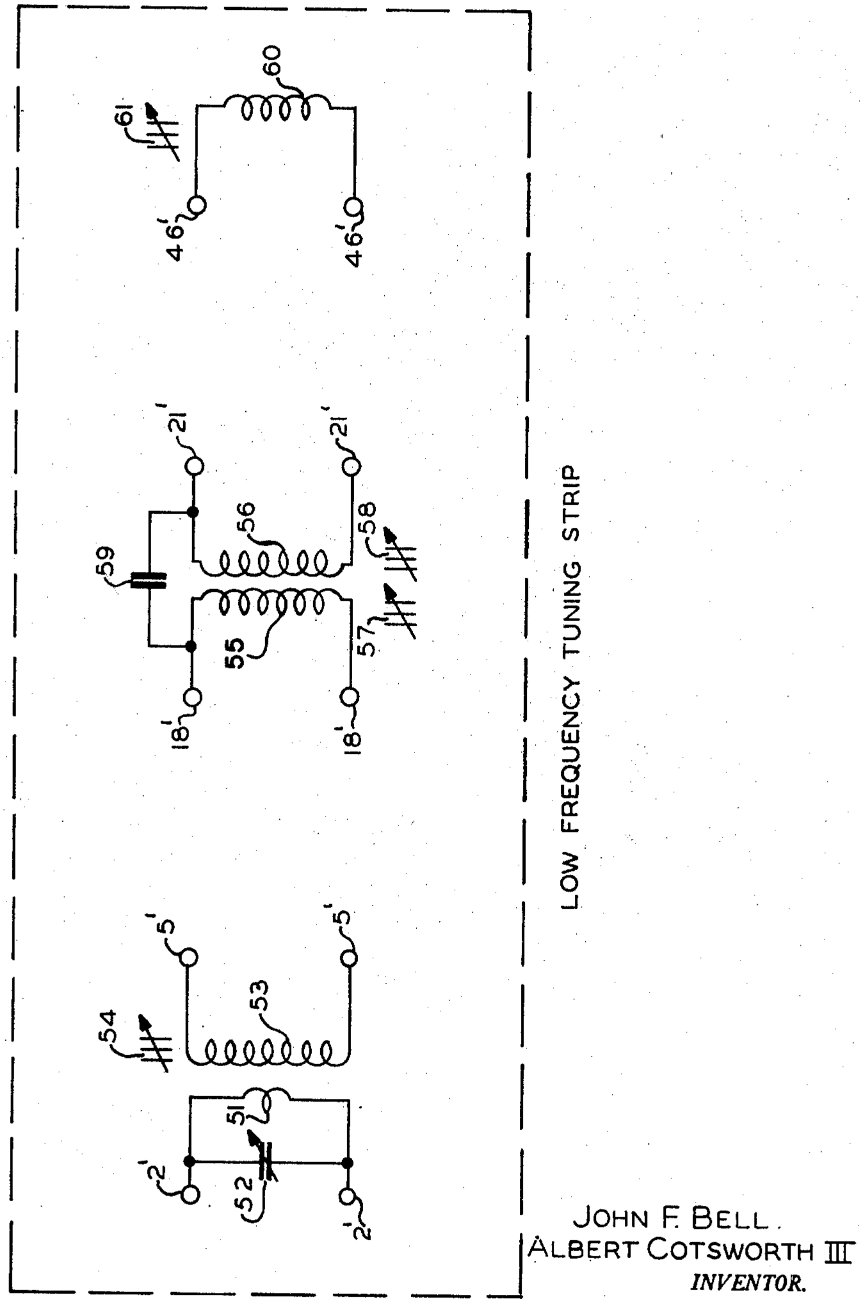
Figure 3:
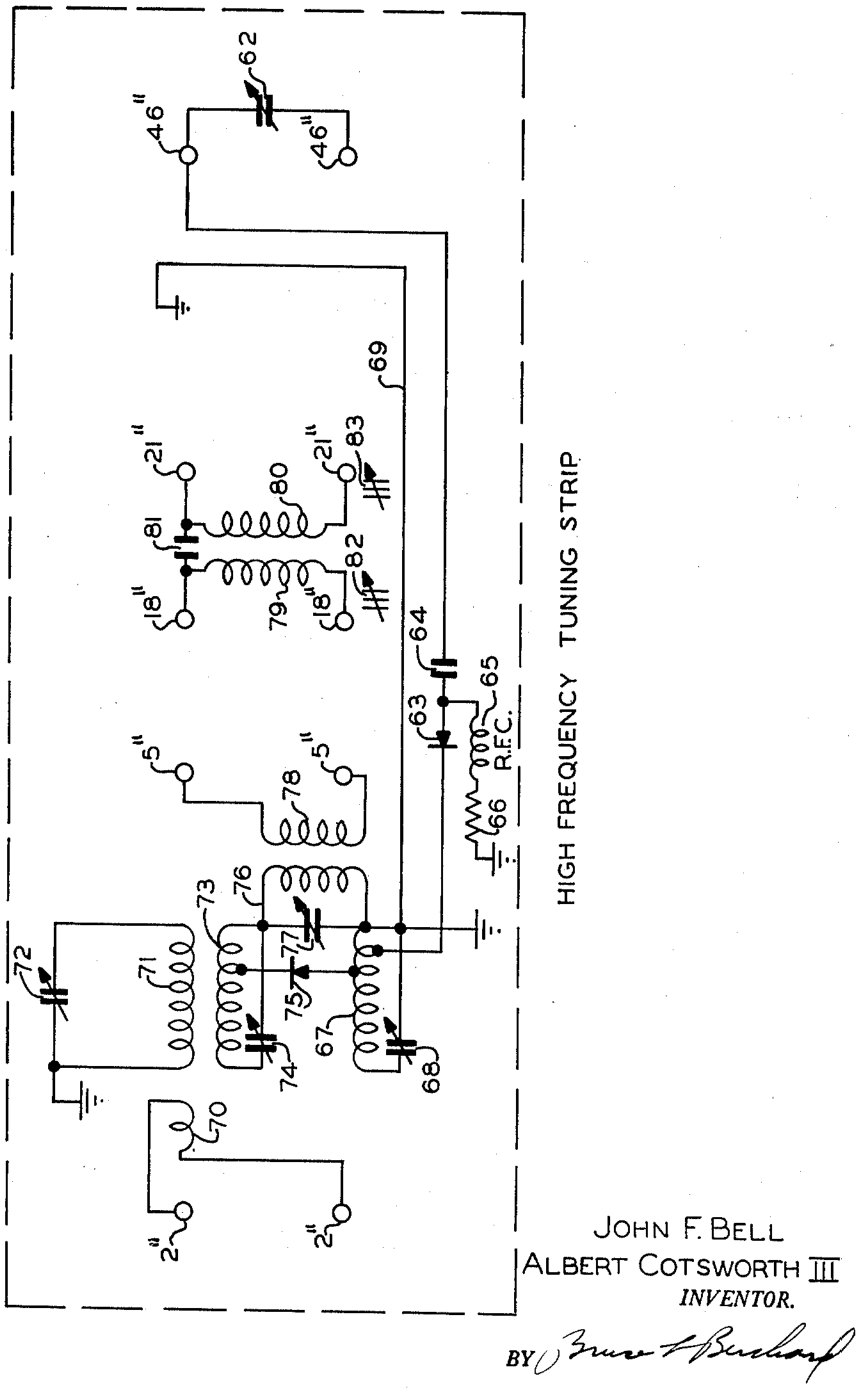
Figure 4:
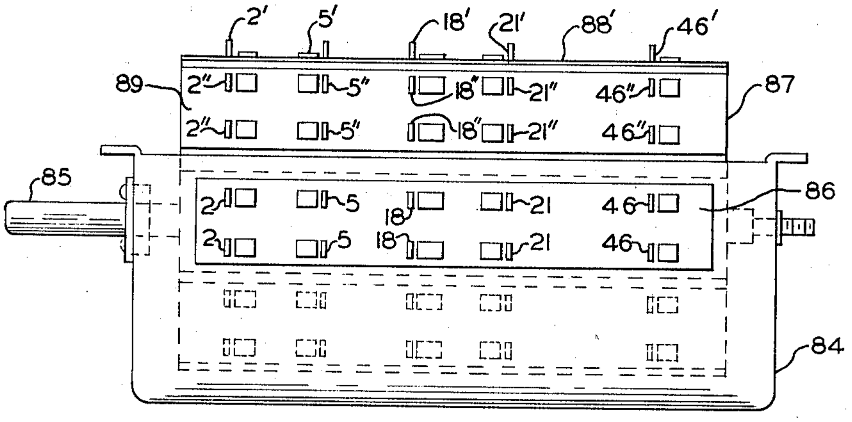

The features of this invention which are believed to be new are set forth with particularity in the appended claims. The invention itself, however, together with further objects and advantages thereof, may best be understood by reference to the following description when taken in conjunction with the accompanying drawings, in which:

Figure 1 shows a television receiver capable of being tuned to selected signal channels by the proposed frequency converter circuit, Figure 2 shows a tuning strip for tuning the receiver of Figure 1 to a signal in a low frequency band, Figure 3 shows a tuning strip carrying the frequency converter circuit, which strip may be mounted on the turret tuner to adapt the receiver to be tuned to a signal in a high frequency band, and, Figure 4 shows a typical turret tuner on which such strips may be mounted.

Figure 1 shows a television receiver circuit capable of being tuned, for example, to television signals lying in the 50 to 220 megacycle band by a turret tuner. In this circuit television signals are received by an antenna 1, this antenna conveniently being of the usual dipole type as shown. The leads from antenna 1 are connected respectively to a pair of terminals 2, and these leads are shunted by a conventional balancing coil 3, the center tap of this coil being grounded. The antenna circuit is coupled to a radio-frequency amplifier, including an electron discharge device 4, through suitable circuit elements carried by the tuning strips of a turret tuner, which elements upon rotation of the tuner are selectively connected between terminals 2 and further terminals 5. The upper terminal 5 is connected to the control electrode 6 of device 4; this control electrode being connected to the usual automatic gain control circuit of the receiver, not shown, through a resistor 7. The terminal of resistor 7 remote from control electrode 6 is by-passed to ground through a capacitor 8. The lower terminal 5 is by-passed to ground through a capacitor 9. The cathode 10 of radio-frequency amplifier device 4 is connected to ground through a cathode biasing resistor 11, shunted by a radio frequency by-pass capacitor 12. The screen electrode 13 is connected to the positive terminal of a source of unidirectional potential, indicated as B+, through a resistor 14, this electrode being by-passed to ground by a capacitor 15. The suppressor electrode 16 of device 4 is connected to the cathode 10. The anode 17 of device 4 is connected to the upper one of a pair of terminals 18, and has associated therewith a trimmer condenser 19 connected to ground. Lower terminal 18 is connected directly to the positive potential terminal B+, and this terminal is by-passed to ground through capacitor 20.

In a manner similar to terminals 2 and 5, terminals 18 and further terminals 21 have appropriate coupling elements switched therebetween by the tuning strips of the turrent tuner, so that selected radio-frequency wave signals may be impressed upon a frequency converter stage including a discharge device 22. The uppermost terminal 21 is connected to control electrode 23 of device 22, this control electrode being connected to the previously mentioned automatic gain control circuit through resistor 24. The lower terminal 21 is by-passed to ground through a capacitor 25. The cathode 26 of device 22 is connected to ground through a cathode biasing resistor 27 shunted by a by-pass capacitor 28. The screen electrode 29 of device 22 is connected to a positive potential terminal B+ through a resistor 30 and further is by-passed to ground through a capacitor 31. The suppressor electrode 32 of device 22 is connected to the cathode. The anode 33 is connected to potential source B+ through series connected inductance coil 34 and a resistor 35. Inductance coil 34 has an adjustable core member, and resonates with its own distributed capacity and other inherent capacitances to constitute a tuned output circuit for device 22. The resonant frequency of this tuned circuit is adjustable by the core member to the desired intermediate frequency of the receiver.

Heterodyning signals are supplied to the frequency converter stage from an oscillatory circuit comprising a discharge device 36. The oscillator circuit is connected in a manner similar to that disclosed in copending application Serial No. 56,161, by Albert Cotsworth, III, entitled "Superheterodyne Receiving Systems," filed October 23, 1948, and assigned to the present assignee. The anode 37 of device 36 is connected to one side of a frequency-determining circuit 38, and the control electrode 39 is coupled to the other side of this circuit through a coupling capacitor 40. The cathode 41 of device 36 is connected directly to ground, and control electrode 39 is connected to ground through a grid leak resistor 42. The frequency-determining circuit contains a coil 38 shunted by a capacitor 43, and the inductance of this coil may be altered slightly for trimming purposes by a movable core 44 in a manner similar to that disclosed in copending application Serial No. 43,036 now abandoned, by Albert Cotsworth III, entitled "Variable Inductance Tuning Systems," filed August 7, 1948, and assigned to the present assignee. A tap on coil 38 is connected to the positive potential terminal B+ for supplying operating potential to the anode 37 of device 36, this anode being coupled to control electrode 23 of device 22 through a capacitor 45.

When selected circuit elements are connected between terminals 2 and 5 and between terminals 18 and 21 by the turret tuner, circuit elements are also connected by the tuner between terminals 46, thereby shunting the oscillator tank circuit 38, 43 by a circuit element to cause the local oscillator to generate heterodyning signals of an appropriate frequency to produce the proper intermediate frequency in the output circuit of the heterodyne stage.

The intermediate-frequency signal output of the frequency converter stage appears across a shunt feed load resistor 35, and is applied to a conventional intermediate-frequency amplifier 47 of one or more stages. The amplified intermediate-frequency signal from unit 47 is detected in a video detector 48, and the detected signals are amplified in a video amplifier 49. Thereafter, the video signals are impressed on the brilliancy control electrode of the usual receiver image tube 50. The conventional sound, synchronizing and scanning sections customarily provided in a television receiver form no part of the present invention and, therefore, they have not been shown.

Figure 2 shows the circuit elements carried by one strip of a turret tuner, which elements, when connected into the circuit of Figure 1 by adjustment of the turret, tune the receiver to a television signal in the low frequency band, for example, in the present day television signal band. In Figure 2, contacts 2′ are shown to be connected to the extremities of an inductance coil 51, this coil being shunted by a capacitor 52. The contacts 5′ are connected to the terminals of an inductance coil 53, which coil has a movable core indicated schematically at 54 and forms a tuned circuit with the distributed capacity in the circuit. The tuned circuits 51—52 and 53 are inductively coupled together, and constitute a radio frequency selector circuit. When the tuning strip of Figure 2 is connected into the circuit of Figure 1, terminals 2′ connect with terminals 2 and terminals 5′ connect with terminals 5, and the tuned circuits connected to terminals 2′ and 5′ couple the antenna circuit to the radio-frequency amplifier. These tuned circuits are adjusted to the frequency of a pre-selected signal, this signal being impressed upon the control electrode 6 of electron discharge device 4.

Another inductance coil 55 is also mounted on the tuning strip of Figure 2 between terminals 18′, and this coil is coupled to a further inductance coil 56 connected between contacts 21′. These coils each form tuned circuits with the distributed capacity inherent in their circuits, and may be tuned by movable cores indicated respectively as 57 and 58. The high potential terminals of coils 55 and 56 are coupled together through a capacitor 59 in the usual manner to form a frequency selective network. This network couples terminals 18′ to terminals 21′ to form the interstage coupling circuit between the radio-frequency amplifier of Figure 1 and the frequency converter stage when the terminals 18′ and 21′ connect respectively with terminals 18 and 21 in the circuit of Figure 1. This interstage coupling circuit is tuned to the same frequency as the radio-frequency selector coupled between terminals 2′ and 5′ and the selected signal is therefore amplified in the radio-frequency amplifier including device 4 and impressed on control electrode 23 of device 22 of Figure 1.

To provide the proper intermediate-frequency signal at the output of the frequency converter stage, local oscillator terminals 46′ have an inductance coil 60 connected therebetween, which coil may be adjusted by a movable core as indicated at 61. The coil 60 is connected into the oscillator circuit when terminals 46′ connect with the terminals 46 in the circuit of Figure 1, and this coil is adjusted to cause the oscillator including device 36 to oscillate at the required frequency to furnish the proper intermediate-frequency signal at the output of the frequency converter stage.

Hence, when the circuit elements on the strip of Figure 2 are properly adjusted and the turret tuner is turned so that this strip is connected into the receiver circuit, a predetermined signal received on antenna 1 is selected by the selector 52, 53 and is impressed on the radio-frequency amplifier including device 4. The amplified signal from device 4 is heterodyned in the frequency converter stage including device 22 with a signal supplied by the oscillator which includes device 36. The coil 60 establishes the frequency of the heterodyning signal to the proper value to develop an intermediate-frequency signal of the correct frequency. The resulting intermediate-frequency signal is selected in the output circuit of device 22 and is impressed upon the intermediate-frequency amplifier 47 for translation by the remaining stages of the receiver in the normal fashion.

The above described system is conventional, and additional strips are provided in the turret tuner to tune the receiver to other selected signals in the television signal frequency band. It is proposed to convert such a conventional receiver for high frequency operation by replacing any of the conventional strips in the turret tuner, for example, strips similar to the one shown in Figure 2, by high frequency strips similar to the one shown in Figure 3 to act as adapter units. This replacement can be simply accomplished, and it will be seen that no further alteration is necessary in the receiver circuit to condition the receiver for operation in a higher frequency band.

When the high frequency strip or adapter unit shown in Figure 3 is mounted on the turret tuner, and the tuner is turned so that the circuit elements on this strip are connected into the receiver circuit of Figure 1, the terminals 46″ cause a capacitor 62 to be shunted across the oscillator tank circuit so that the oscillator operates at a selected frequency. It can be seen from Figure 1 that the upper terminal 46 is connected to the anode 47 of oscillator discharge device 36, and hence the generated heterodyning signals are present at this terminal. On the tuning strip of Figure 3, upper terminal 46″ is coupled to a non-linear device 63 through a capacitor 64. The non-linear device 63 is preferably of the crystal type and acts as a harmonic generator. When desired this crystal may be replaced by any suitable type of harmonic generator. The crystal 63 is connected to ground through a radio-frequency choke coil 65 and self-biasing resistor 66. A tuned circuit, comprising an inductance coil 67 shunted by a variable capacitor 68, forms the output circuit of crystal 63, this crystal being connected to a tap on inductance coil 67, as shown. The circuit 67—68 is tuned to a desired harmonic of the frequency of the output signal of the oscillator circuit of Figure 1, as determined by the element 62. The lead from terminal 46 to crystal 63 has a grounded lead 69 placed adjacent thereto, serving as a shield to prevent the heterodyning signal carried by the first mentioned lead from interfering with other circuit elements on the strip.

Terminals 2″ of the high frequency strip are connected to a coil 70, which is coupled inductively to an inductance coil 71 shunted by variable capacitor 72. Inductance coil 71 is coupled to another inductance coil 73 likewise shunted by a variable capacitor 74. Tuned circuits 71—72 and 73—74 are tuned to the frequency of a selected high frequency signal, this signal being received by antenna 1 of Figure 1 and appearing across terminals 2″ on the high frequency strip. The double tuned circuit 71—72 and 73—74 is used for adequate pre-selection of the received signal. The network on the strip between terminals 2″ and 5″ now forms a non-linear crystal frequency converter or other suitable type and the high frequency signal appearing across terminals 2″, is heterodyned by a harmonic of the local oscillator frequency, which harmonic is generated by crystal 63. The frequency converter stage is formed by the circuit 73—74 tuned to the frequency of the received high frequency signal, the circuit 67—68 tuned to a harmonic of the local oscillator frequency, and a further non-linear crystal device 75 connecting taps on inductance coils 67 and 73, as shown. An output circuit for the frequency converter stage is formed by a tuned circuit comprising an inductance coil 76 shunted by a variable capacitor 77, this tuned output circuit being connected between the low potential terminals of circuit 73—74 and circuit 67—68, as shown. Tuned circuit 76—77 is tuned to a first intermediate frequency, and a first intermediate-frequency signal is impressed on terminals 5'', in response to a selected high frequency signal together with the oscillating potential from rectifier 63, by inductive coupling between coil 76 and coil 78.

The first intermediate-frequency signal is impressed on control electrode 6 of discharge device 4 of Figure 1, which device formerly acted as a radio-frequency amplifier and now acts as an amplifier for the first intermediate-frequency signal. The circuit between terminals 18'' and 21'' on the strip of Figure 3 acts as a frequency selector network for coupling the first intermediate-frequency amplifier including discharge device 4 to the frequency converter stage including device 22. This frequency selective network comprises an inductance coil 79 connected between terminals 18'' and inductively coupled to an inductance coil 80 between terminals 21'', these coils being capacitively coupled at their high potential sides through a capacitor 81. The inductance coil 79 forms a tuned circuit with the distributed capacity of the coil and associated circuit, this tuned circuit being tuned by a movable core in coil 79 as shown at 82, and coil 80 forms a tuned circuit with distributed capacity of its circuit, this circuit being tuned by a movable core indicated at 83 in the coil 80. These circuits are tuned to the frequency of the first intermediate-frequency signal, to impress that signal on the control electrode 23 of device 22 of Figure 1.

The device 22 now acts as a second heterodyne stage, and the first intermediate-frequency signal is heterodyned therein with the heterodyning signal from the oscillator including device 36, this heterodyning signal being impressed on control electrode 23 of device 22, as previously, through a capacitor 45. The circuit components on the high frequency tuning strip are so designed that the second intermediate-frequency signal produced by the frequency converter stage including device 22 corresponds to the intermediate-frequency signal to which amplifier 47 of Figure 1 is selective. This second intermediate-frequency signal is impressed on intermediate-frequency amplifier 47, and this amplifier together with the video detector 48 and video amplifier 49 act, as previously, to impress a video signal on the image tube 50.

In television receivers it is desirable to have the multiplied frequency of the local oscillator lower than the frequencies of the received high frequency signal in order that the received television signal may be converted to a first intermediate frequency having sound signal components at the high frequency end of its associated band of modulation components. Furthermore, it is desirable that the frequency of the local oscillation injected into device 22 of Figure 1 for the second heterodyne action be on the high frequency side of the first intermediate frequency signal, also as is equivalent to the case in single heterodyne television reception. Thus the received high frequency signal has a higher frequency than any of the tuned circuits on the entire high frequency strip.

Figure 4 shows the low frequency tuning strip of Figure 2 and the high frequency tuning strip, or adapter unit, of Figure 3 mounted on a typical turret tuner. The tuner consists of a housing 84 having a shaft member rotatably mounted thereon, and a fixed terminal strip 86 attached thereto. The shaft member 85 carries a rotational member 87 which in turn carries a plurality of longitudinal, movable tuning strips. Rotation of shaft 85 rotates the rotational member 87, and causes terminals on the respective movable tuning strips to connect with corresponding terminals on the fixed strip 86. The terminals on the fixed strip are directly connected into the receiver circuit of Figure 1, and are numbered 2, 5, 18, 21 and 46 corresponding to similarly numbered terminals in the receiver circuit of Figure 1. One of the movable tuning strips, indicated as 88, corresponds to the low frequency strip shown in Figure 2, and this strip carries the elements illustrated in Figure 2 connected to correspondingly primed terminals 2', 5', 18', 21' and 46'. The movable tuning strip, indicated as 89, corresponds to the adapter unit shown in Figure 3, and this strip carries the elements illustrated in that figure connected to correspondingly double primed contacts 2'', 5'', 18'', 21'' and 46''. Hence, rotation of the shaft 85 can cause the terminals on adapter unit 89 to connect with the terminals on fixed strip 86, or the terminals on strip 88 to connect with the fixed strip terminals. In the latter case, as previously described, the receiver is tuned to a selected signal in the low frequency band, and in the former case the receiver is adapted to be tuned to a selected signal in the high frequency band.

The following frequency relations have been incorporated into a practical embodiment of the invention, and are given by way of example. In this embodiment the high frequency strip was tuned to receive a 517 megacycle signal, tuned circuit 71—72 and 73—74 being tuned to 517 megacycles. The local oscillator frequency was adjusted to 90.458 megacycles, and the fifth harmonic of this frequency was selected from crystal 63, tuned circuit 67—68 being tuned to this fifth harmonic namely 452.2915 megacycles. The tuned output circuit 76—77 of the crystal mixer network was tuned to 64.708 megacycles, this being the frequency of the first intermediate frequency signal. This first intermediate frequency signal was impressed on heterodyne device 22 of Figure 1 and heterodyned with the fundamental frequency of the local oscillator, namely 90.458 megacycles which resulted in the second intermediate frequency signal 25.75 megacycles. The bias resistor 66 on the frequency multiplier crystal 63 was found to have an optimum value of approximately 27,000 ohms. The reason for this was that this crystal generated more and higher order harmonics when it was driven somewhat beyond cut-off. However, when the bias resistor was too high, very little harmonic power was generated. The fifth harmonic of the local oscillator frequency was chosen as the desired harmonic, since the second, third or fourth harmonics resulted in a first intermediate frequency outside the range of the local oscillator in the production of the desired second intermediate frequency.

Due to the limited amount of space on the turret tuner strip, it is not practical to use coaxial lines, butterflies, or other circuits which it has been customary to use for extremely high frequencies. However, since the crystal shunt capacities are of the order of one micro microfarad, usual inductance coils and capacitors, suitably scaled down in size, become very practical and provide resonant circuits having a reasonable Q in a very small space.

This invention provides, therefore, a simple and convenient system for converting single heterodyne receivers to double heterodyne receivers, whereby the tuning range of said receivers is greatly increased. The present invention enables a receiver to be operated on both the low frequency and the high frequency bands, it being merely necessary to install high frequency strips in the turret tuner for desired high frequency signals and low frequency strips for desired low frequency signals.

Although a specific embodiment of the invention has been shown and described, modifications may be made, and it is intended in the appended claims to cover all such modifications as fall within the true spirit and scope of the invention.

We claim:

1. A tunable receiver for utilizing wave signals included in a first and second frequency band comprising, an input circuit, an oscillator for supplying a heterodyning signal, a first frequency converter of the electron discharge type having input electrodes coupled to said input circuit and to said oscillator during operating intervals in which said receiver is conditioned to accept wave signals in said first band and having an output circuit for producing an intermediate frequency signal, and a circuit coupled to said output circuit for utilizing said intermediate frequency signal; a tuning device for conditioning said receiver to accept signals in said second band comprising a second frequency converter having input and output terminals and a signal source coupled to said second converter for supplying a second heterodyning signal thereto, said tuning device being movable as a unit from a first position in which said tuning device is non-functionally included in said receiver to a second position in which said input and output terminals of said second converter are respectively coupled to said input circuit and to said input electrodes of said first converter, and a control member for selectively moving said tuning device between said first and second positions.

2. A tunable receiver for utilizing wave signals included in a first and second frequency band comprising, an input circuit, a radio frequency amplifier of the electron discharge type having input electrodes coupled to said input circuit and having output electrodes, an oscillator for supplying a heterodyning signal, a first frequency converter of the electron discharge type having input electrodes coupled to said output electrodes and to said oscillator during operating intervals in which said receiver is conditioned to accept wave signals in said first band and having an output circuit wherein an intermediate frequency signal is produced, and an intermediate frequency amplifier coupled to said output circuit for utilizing said intermediate frequency signal; a tuning device for conditioning said receiver to accept signals in said second band comprising a second frequency converter having input and output terminals, a heterodyne-signal supply circuit coupled to said second converter for supplying a second heterodyning signal thereto, and a frequency-selective network having input and output terminals, said tuning device being movable as a unit from a first position in which said tuning device is non-functionally included in said receiver to a second position in which said input and said output terminals of said second converter are respectively coupled to said input circuit and to said input electrodes of said radio frequency amplifier, and in which said input and output terminals of said frequency-selective network are respectively coupled to said output electrodes of said radio frequency amplifier and to said input electrodes of said first converter, and a control member for selectively moving said tuning device between said first and second positions.

3. A tunable receiver for utilizing wave signals included in a first and second frequency band comprising, an input circuit, a radio frequency amplifier of the electron discharge type having input electrodes coupled to said circuit and having output electrodes, an oscillator for supplying a heterodyning signal, a first frequency converter of the electron discharge type having input electrodes coupled to said output electrodes and to said oscillator during operating intervals in which said receiver is conditioned to accept wave signals in said first band and having an output circuit wherein an intermediate frequency signal is produced, and an intermediate frequency amplifier coupled to said output circuit for utilizing said intermediate frequency signal; a tuning device for conditioning said receiver to accept signals in said second band comprising a second frequency converter having input and output terminals, a signal producing circuit including a non-linear device coupled to said second converter for supplying a second heterodyning signal thereto, and a frequency-selective network having input and output terminals, said tuning device being movable as a unit from a first position in which said tuning device is non-functionally included in said receiver to a second position in which said input and output terminals of said second converter are respectively coupled to said input circuit and to said input electrodes of said radio frequency amplifier, in which said signal producing circuit is coupled to said first mentioned oscillator, and in which said input and output terminals of said frequency-selective network are respectively coupled to said output electrodes of said radio frequency amplifier and to said input electrodes of said first converter, and a control member for selectively moving said tuning device between said first and second positions.

4. A tunable receiver for utilizing wave signals included in a first and second frequency band comprising, an input circuit, a radio frequency amplifier of the electron discharge type having input electrodes coupled to said input circuit and having output electrodes, an oscillator for supplying a heterodyning signal, a first frequency converter of the electron discharge type having input electrodes coupled to said output electrodes and to said oscillator during operating intervals in which said receiver is conditioned to accept wave signals in said first band and having an output circuit for producing an intermediate frequency signal, and an intermediate frequency amplifier coupled to said output circuit for utilizing said intermediate frequency signal; a tuning device for conditioning said receiver to accept signals in said second band comprising a second frequency converter including a non-linear crystal device having input and output terminals, a harmonic generator circuit including a non-linear crystal device coupled to said second converter for supplying a second heterodyning signal thereto, and a frequency-selective network having input and output terminals, said tuning device being movable as a unit from a first position in which said tuning device is non-functionally included in said receiver to a second position in which said input and output terminals of said second converter are respectively coupled to said input circuit and to said input electrodes of said radio frequency amplifier, in which said harmonic generator circuit is coupled to said first mentioned oscillator, and in which said input and output terminals of said frequency-selective network are respectively coupled to said output electrodes of said radio frequency amplifier and to said input electrodes of said first converter, and a control member for selectively moving said tuning device between said first and second positions.

5. In a superheterodyne receiver which includes, an input circuit, an oscillator for supplying heterodyning signal, a first frequency converter of the electron discharge type having input electrodes coupled to said oscillator during intervals when said receiver is conditioned to accept wave signals in given frequency bands and having an output circuit for producing an intermediate frequency signal, and a circuit coupled to said output circuit for utilizing said intermediate frequency signal; a tuning device for conditioning said receiver to receive a selected signal in a frequency band outside the normal range of said receiver and comprising, a second frequency converter having input and output terminals, and a heterodyne-signal supply circuit coupled to said second converter for supplying a second heterodyning signal thereto; and a tuning mechanism supporting said tuning device for selectively moving said tuning device from an inoperative position to a position in which said input and output terminals of said second converter are respectively coupled to said input circuit and to said input electrodes of said first converter.

6. In a superheterodyne receiver which includes, an input circuit, a radio frequency amplifier of the electron discharge type having input electrodes and output electrodes, an oscillator for supplying a heterodyning signal, a first frequency converter of the electron discharge type having input electrodes coupled to said oscillator during intervals when said receiver is conditioned to accept wave signals in a given frequency band and having an output circuit for producing an intermediate frequency signal, and an intermediate frequency amplifier coupled to said output circuit for utilizing said intermediate frequency signal; a tuning device for conditioning said receiver to receive a selected signal in a frequency band outside the normal range of said receiver and comprising a second frequency converter having input and output terminals, a heterodyne signal supply circuit to be energized by said oscillator and coupled to said second converter for supplying a second heterodyning signal thereto, and a frequency-selective network having input and output terminals; and a tuning mechanism supporting said tuning device for selectively moving said tuning device from an inoperative position to a position in which said input and output terminals of said second converter are respectively coupled to said input circuit and to said input electrodes of said radio frequency amplifier, in which said supply circuit is coupled to said oscillator, and in which said input and output terminals of said frequency-selective network are respectively coupled to said output electrodes of said radio frequency amplifier and to said input electrodes of said first converter.

7. In a superheterodyne receiver which includes, an input circuit, a radio frequency amplifier of the electron discharge type having input electrodes and output electrodes, an oscillator for supplying a heterodyning signal, a first frequency converter of the electron discharge type having input electrodes coupled to said oscillator during intervals when said receiver is conditioned to accept wave signals in a given frequency band and having an output circuit for producing an intermediate frequency signal, and an intermediate frequency amplifier coupled to said output circuit for utilizing said intermediate frequency signal; a tuning device for conditioning said receiver to receive a selected signal in a frequency band outside the normal range of said receiver and comprising, a second frequency converter having input and output terminals, a harmonic signal producing circuit to be energized by said oscillator and coupled to said second converter for supplying a second heterodyning signal thereto, and a frequency-selective network having input and output terminals; and a tuning mechanism supporting said tuning device for selectively moving said tuning device from an inoperative position to a position in which said input and output terminals of said second converter are respectively coupled to said input circuit and to said input electrodes of said radio frequency amplifier, in which said signal producing circuit is coupled to said first mentioned oscillator, and in which said input and output terminals of said frequency-selective network are respectively coupled to said output electrodes of said radio frequency amplifier and to said input electrodes of said first converter.

8. In a superheterodyne receiver which includes, an input circuit, a radio frequency amplifier of the electron discharge type having input electrodes and output electrodes, an oscillator for supplying a heterodyning signal, a first frequency converter of the electron discharge type having input electrodes coupled to said oscillator during intervals when said receiver is conditioned to accept wave signals in a given frequency band and having an output circuit for producing an intermediate frequency signal, and an intermediate frequency amplifier coupled to said output circuit for utilizing said intermediate frequency signal; a tuning device for conditioning said receiver to receive a selected signal in a frequency band outside the normal range of said receiver and comprising, a second frequency converter including a non-linear crystal device having input and output terminals, a harmonic generator circuit including a non-linear crystal device coupled to said second converter for supplying a second heterodyning signal thereto, and a frequency-selective network having input and output terminals; and a tuning mechanism supporting said tuning device for selectively moving said tuning device from an inoperative position to a position in which said input and output terminals of said second converter are respectively coupled to said input circuit and to said input electrodes of said radio frequency amplifier, in which said harmonic generator circuit is coupled to said first mentioned oscillator, and in which said input and output terminals of said frequency-selective network are respectively coupled to said output electrodes of said radio frequency amplifier and to said input electrodes of said first converter.

9. A tunable receiver for utilizing wave signals included in a first and second frequency band, comprising, an input circuit, an oscillator for supplying a heterodyning signal, a first frequency converter having input terminals coupled to said input circuit and to said oscillator during intervals when said receiver is conditioned to accept wave signals in said first band and having an output circuit for producing an intermediate-frequency signal, and a circuit coupled to said output circuit for utilizing said intermediate frequency signal; a tuning device for conditioning said receiver to accept signals in said second band comprising, a second frequency converter having input and output terminals, and a heterodyne-signal supply circuit coupled to said second converter for supplying a second heterodyning signal thereto, said tuning device being movable as a unit from a first position in which said tuning device is non-functionally included in said receiver to a second position in which said input and output terminals of said second converter are respectively coupled to said input circuit and to said input terminals of said first converter; and a control member for selectively moving said tuning device between said first and second positions.

10. A receiver for utilizing wave signals comprising, an input circuit, an oscillator for supplying a heterodyning signal, a first frequency converter coupled to said oscillator for producing an intermediate-frequency signal, during intervals when said receiver is conditioned to accept wave signals in a given frequency band and a circuit coupled to said converter for utilizing said intermediate-frequency signal; a turret tuning mechanism for selectively tuning said receiver to a plurality of preselected signal channels including at least one tuning strip which comprises a second frequency converter circuit having input and output terminals for coupling said input circuit to said first frequency converter and which further comprises a heterodyne-signal supply circuit coupled to said second converter for supplying a second heterodyning signal thereto.

11. A receiver for utilizing wave signals included in a first and second frequency band comprising, an input circuit, an oscillator for supplying a heterodyning signal, a first frequency converter coupled to said oscillator for producing an intermediate frequency signal, during intervals when said receiver is conditioned to accept wave signals in given frequency bands and a circuit coupled to said first converter for utilizing said intermediate frequency signal; a turret tuning mechanism for selectively tuning said receiver to a plurality of signal channels in said first and second frequency bands including at least one tuning strip which comprises a second converter circuit having input and output terminals for coupling said input circuit to said first converter and which further comprises a signal source coupled to said second converter for supplying a second heterodyning signal thereto.

12. A receiver for utilizing wave signals included in a first and second frequency band comprising, an input circuit, an oscillator for supplying a heterodyning signal, a first frequency converter coupled to said oscillator for producing an intermediate frequency signal, during intervals when said receiver is conditioned to accept wave signals in given frequency bands and a circuit coupled to said converter for utilizing said intermediate-frequency signal; a turret tuning mechanism for selectively tuning said receiver to a plurality of signal channels in said first and second frequency bands including at least one tuning strip which comprises a non-linear crystal frequency converter circuit having input and output terminals for coupling said input circuit to said first frequency converter and which further comprises a non-linear crystal harmonic generator circuit for coupling said oscillator to said crystal converter to supply a second heterodyning signal to said crystal converter.

13. A tuning strip for a turret tuner for selectively tuning a television receiver to a signal channel comprising: a supporting member including insulating material; a mixer stage mounted on said supporting member for heterodyning a pair of applied signals; a heterodyne-signal supply circuit mounted on said strip for supplying a heterodyning signal to said mixer stage; contacts affixed to said member and coupled to said mixer stage for applying a received television signal to said mixer stage; an output circuit included in said mixer stage for deriving a preselected output signal from said mixer stage; and further contacts affixed to said member and coupled to said output circuit for supplying said output signal to a utilizing circuit of the television receiver.

14. A tuning strip for a turret tuner for selectively tuning a television receiver to a signal channel comprising: a supporting member including insulating material; a mixer stage mounted on said supporting member for heterodyning a pair of applied signals; a heterodyne-signal supply circuit including a non-linear device mounted on said strip for supplying a heterodyning signal to said mixer stage; contacts affixed to said member and coupled to said mixer stage for applying a received television signal to said mixer stage; an output circuit included in said mixer stage for deriving a preselected output signal from said mixer stage; and further contacts affixed to said member and coupled to said output circuit for supplying said output signal to a utilizing circuit of the television receiver.

15. A tuning strip for a turret tuner for selectively tuning a television receiver to a signal channel comprising: a supporting member including insulating material; a mixer stage mounted on said supporting member for heterodyning a pair of applied signals; a harmonic signal producing circuit mounted on said strip for supplying a heterodyning signal to said mixer stage; contacts affixed to said member and coupled to said mixer stage for applying a received television signal to said mixer stage; an output circuit included in said mixer stage for deriving a preselected output signal from said mixer stage; and further contacts affixed to said member and coupled to said output circuit for supplying said output signal to a utilizing circuit of the television receiver.

16. A tuning strip for a turret tuner for selectively tuning a television receiver to a signal channel comprising: a supporting member including insulating material; a mixer stage including a non-linear crystal device mounted on said supporting member for heterodyning a pair of applied signals; a harmonic generator including a non-linear crystal device mounted on said strip for supplying a heterodyning signal to said mixer stage; contacts affixed to said member and coupled to said mixer stage for applying a received television signal to said mixer stage; an output circuit included in said mixer stage for deriving a preselected output signal from said mixer stage; and further contacts affixed to said member and coupled to said output circuit for supplying said output signal to a utilizing circuit of the television receiver.

JOHN F. BELL.
ALBERT COTSWORTH, III.

REFERENCES CITED

The following references are of record in the file of this patent:

UNITED STATES PATENTS

| Number | Name | Date |
|---|---|---|
| 1,987,616 | Gebhard | Jan. 15, 1935 |
| 2,028,212 | Heising | Jan. 21, 1936 |
| 2,029,461 | Brush | Feb. 4, 1936 |
| 2,078,908 | Harrison | Apr. 27, 1937 |
| 2,150,553 | Koch | Mar. 14, 1939 |
| 2,173,898 | Conron | Sept. 26, 1939 |
| 2,186,455 | Goldmark | Jan. 9, 1940 |
| 2,186,980 | Lowell | Jan. 16, 1940 |
| 2,215,775 | Banfield | Sept. 24, 1940 |
| 2,266,525 | Wendt | Dec. 16, 1941 |
| 2,451,291 | Koch | Oct. 12, 1948 |

OTHER REFERENCES

Crystal Devices Inc. Advertisement, page 106 "Radio and Television News," vol. 39, #1, January 1948.